United States Patent
Kuroda et al.

(12)

(10) Patent No.: US 6,436,505 B2
(45) Date of Patent: *Aug. 20, 2002

(54) VACUUM THERMAL INSULATOR (75) Inventors: Toshiya Kuroda, Takatsuki; Taiichi Sakaya, Taiichi, both of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,895

(22) Filed: Dec. 16, 1998

(30) Foreign Application Priority Data

| Dec. 16, 1997 | (JP) | 9-346200 |
| Dec. 16, 1997 | (JP) | 9-346201 |
| Mar. 10, 1998 | (JP) | 10-058667 |
| Mar. 10, 1998 | (JP) | 10-058672 |
| Mar. 10, 1998 | (JP) | 10-058673 |

(51) Int. Cl.$^7$ ................................................ B32B 1/06
(52) U.S. Cl. .................................... 428/69; 428/76
(58) Field of Search ................ 428/69, 76; 52/406.2

(56) References Cited

U.S. PATENT DOCUMENTS

| 4,120,932 A | * | 10/1978 | Roth | 264/292 |
| 5,273,801 A | * | 12/1993 | Barry et al. | 52/406.2 |
| 5,316,816 A | * | 5/1994 | Sextl et al. | 428/69 |
| 5,693,399 A | * | 12/1997 | Himeshima et al. | 428/69 |

* cited by examiner

Primary Examiner—Alexander S. Thomas
(74) Attorney, Agent, or Firm—Fitch, Even, Tabin & Flannery (57) ABSTRACT A vacuum thermal insulator which is excellent in thermal insulation property and maintainability in that property is disclosed. The vacuum thermal insulator comprises a shell which defines a vacuum space inside and comprises at least one layer (GB layer) comprising a thermoplastic resin and satisfying the formula (1):

$$W \times \lambda \times P < 1 \times 10^{-6} \qquad (1)$$

wherein W is a thickness (m) of the GB layer, $\lambda$ is a thermal conductivity (W/m·K) of the GB layer and P is an oxygen permeability (cc/m$^2$·day·atm) of the GB layer at 23° C. in a humidity of 50% RH.

20 Claims, 3 Drawing Sheets

BASE LINE
k (IN TERMS OF LENGTH) IS NOT SMALLER THAN WIDTH OF ONE RESIN CHAIN
$\theta_d \rightarrow$ ANGLE OF DIFFRACTION CORRESPONDING TO "UNIT THICKNESS a + WIDTH OF ONE RESIN CHAIN"

VACUUM THERMAL INSULATOR

BACKGROUND OF THE INVENTION

1. Field of the Invention

The present invention relates to vacuum thermal insulators, and particularly to vacuum thermal insulation vacuum thermal insulators having good thermal insulation property which is maintained for a long time.

2. Description of Related Art

Vacuum thermal insulators that have a structural body which is sealed by a container or a wrapping material composed of a gas barrier material and which has a substantially vacuum space inside has been known. Also, a vacuum thermal insulator which has core materials filled in the structural body in order to improve its thermal insulation property and maintain its shape also has been known. Such vacuum thermal insulators can attain high thermal insulation property by maintaining the inside of the structural body at a high vacuum degree to minimize heat transmission caused by gas. In order to maintain such high thermal insulation property for a long time, it is important to form the structural body of a material which has excellent gas barrier property.

Resin, particularly thermoplastic resin, is a preferable material for the structural body in view of its good moldability. However, even PVDC (polvinylidene chloride) and EVOH (a saponified ethylene/vinyl acetate copolymer), which are representative resins of high gas barrier property, are not satisfactory to be used for vacuum thermal insulators and they can not maintain the high thermal insulation property for a long time.

For example, Japanese unexamined patent publications Nos. Shou 63-279083 and Shou 63-233284 disclose that a laminate in which aluminium foil is laminated on a thermoplastic resin film can produce a structural body having good gas barrier property. A vacuum thermal insulator composed of such a laminate can maintain a high vacuum degree for a long time. However, metals such as aluminium have relatively high heat conductivity comparing to resin and air. For example, although heat conductivity of polypropylene resin and air, respectively, are about 0.23 W/m•K and about 0.02 W/m•K, that of aluminium is about 200 W/m•K. Accordingly, a vacuum thermal insulator composed of a metal laminate causes "heat bridging" which is a phenomenon that heat is transmitted in the metal layer and the thermal insulation property drastically deteriorates. The attempt to suppress the heat bridging by thinning the metal layer has resulted in many pinholes opening in the metal layer and has caused deterioration in the gas barrier property and maintainability of the property for a long time.

SUMMARY OF THE INVENTION

The present inventors have studied to develop thermal insulators having good thermal insulation property which is maintained for a long time, and have accomplished the present invention.

The present invention provides a vacuum thermal insulator comprising a shell which has a vacuum space inside and has at least one layer (hereinafter referred to as a "GB layer") which contains a resin and satisfies the formula (1):

$$W \cdot \lambda \cdot P < 1 \times 10^{-6} \tag{1}$$

wherein W is the thickness (m) of the GB layer, $\lambda$ is the heat conductivity (W/m•K) of the GB layer and P is the oxygen permeability (cc/m²•day•atm) of the GB layer at 23° C. in a humidity of 50% RH.

DETAILED DESCRIPTION OF THE INVENTION

The vacuum thermal insulator of the present invention has a shell which has a vacuum space inside. The shell is not limited in its hardness so long as it can be used for a vacuum thermal insulator. That is, both one which is hard enough to maintain a desired shape by itself and one which is soft and can not maintain the desired shape by itself are referred to as the shell.

The GB layer in the shell is a layer which contains a resin, and a product of whose thickness W (m), thermal conductivity $\lambda$ (W/m•K) and oxygen permeability at 23° C. in a humidity of 50% RH P (cc/m²•day•atm) satisfies the formula (1):

$$W \cdot \lambda \cdot P < 1 \times 10^{-6} \tag{1}$$

When a layer containing a resin satisfies the formula (1), deterioration of the thermal insulation property due to the heat bridging and deterioration in the thermal insulation property in the course of time can be efficiently suppressed. It is preferable that the product, $W \cdot \lambda \cdot P$, is as small as possible. Specifically, the product is preferably less than $2 \times 10^{-7}$, and more preferably less than $1 \times 10^{-7}$. When the vacuum thermal insulator is used for a use which requires extremely high thermal insulation property, the product is preferably less than $1 \times 10^{-8}$, more preferably less than $1 \times 10^{-9}$, and most preferably $1 \times 10^{-10}$.

Values of W, $\lambda$ and P can be determined by the measuring techniques mentioned below. When the GB layer is too thin and it is difficult to determine the values of $\lambda$ and P of the GB layer directly, they can be calculated by using the heat conductivity and the oxygen permeability of the whole shell and those of the layer(s) other than the GB layer contained in the shell.

Individual values of W, $\lambda$ and P are not particularly limited so long as the product of them is less than $1 \times 10^{-6}$. In view of suppressing the heat bridging, W is preferably 10 mm or less, more preferably 1 mm or less, and most preferably 100 μm. Also, W is preferably 1 mm or more. λ is preferably 100 W/m•K, more preferably 10 W/m•K or less, and most preferably 1 W/m•K or less. Also, λ is 0.001 W/m•K or more.

In view of maintainability in thermal insulation property for a long time, the oxygen permeability of the GB layer at 23° C. in a humidity of 50% RH is preferably not more than 0.5 cc/m$^2$•day•atm, more preferably not more than 0.1 cc/m$^2$•day•atm, and still more preferably not more than 0.01 cc/m$^2$•day•atm. Also, P is preferably 1×10$^{-5}$ cc/m$^2$•day•atm or more. When the oxygen permeability of the GB layer at 23° C. is relatively small, it can be determined from extrapolation of an arrhenius' plot which has been made on the basis of oxygen permeability data detected in a high temperature range.

The resin contained in the GB layer is preferably a resin which has excellent gas barrier property in view of the maintainability of the thermal insulation property. For example, liquid crystal-type polymers such as liquid polyester resin, hydrophobic resins such as aramid resin, resins having 20–60% by weight of hydrogen bonding group or ionic group (hereinafter referred to as "highly hydrogen bonding resins"), thermosetting resins such as aromatic epoxy resin and phenol resin can be listed. Among the high hydrogen bonding resins, ones having 30–50% by weight of hydrogen bonding group or ionic group are preferred. Here, the high hydrogen bonding group is a group that has at least one hydrogen atom which is directly attached to a hetero atom other than a carbon atom. The ionic group is a group that has positive or negative charges polarizing to the extent that it can hydrate in water.

Examples of the hydrogen bonding group contained in the highly hydrogen bonding resin are a hydroxyl group, amino group, imino group, thiol group, carboxyl group, sulfonic acid group and phosphoric acid group. The hydroxyl group, amino group, carboxyl group and sulfonic acid group are preferred. Examples of the ionic group are carboxylate group, sulfonate ion group, phosphate ion group, ammonium ion group and phosphonium ion group. The carboxylate group, sulfonic ion group and ammonium group are preferred.

Specific examples of the highly hydrogen bonding resins to be used in the present invention include polyvinyl alcohol, ethylene/vinyl alcohol copolymers having a viniy alcohol unit fraction of at least 41 mole %, polysaccharides such as hydroxymethylcellulose, hydroxyethylcellulose, carboxymethylcellulose, amylose, amylopectin, pullulan, cardran, xanthan, chitin, chitosan and cellulose, polyacrylic acid, sodium polyacrylate, polybenzenesulfonic acid, sodium polybenzenesulfonate, polyethyleneimine, polyallylamine and ammonium salt thereof, polyvinylthiol and polyglycerol. Particularly preferable highly hydrogen bonding resin are polyvinyl alcohol and polysaccharides.

Polyvinyl alcohol is a polymer prepared by hydrolyzing (saponifying) ester bonds in polyvinyl acetate. It has a structure of a copolymer of vinyl alcohol and ethyl acetate. The saponification degree of polyvinyl alcohol is preferably at least 70%, and more preferably at least 85%, based on the total number of ester bonds and bonds derived therefrom. The polymerization degree of polyvinyl alcohol is preferably 100 or more and 5,000 or less.

The polysaccharides are biopolymers which are synthesized by polycondensation of various monosaccharides in organisms. In the present invention, the polysaccharides may include not only ones synthesized in organisms but also ones obtained by chemically modifying them.

The GB layer may be either a layer of the above-mentioned resin or a layer of a resin composition containing a resin and a material which can impart gas barrier property to the resin such as a metal oxide, a metal hydroxide and an inorganic laminar compound. Particularly, a resin composition comprising the resin and the inorganic laminar compound is preferred. When the GB layer is composed of such a resin composition, it is preferred that the resin forms a continuous phase in view of mechanical strength.

The inorganic laminar compound is an inorganic compound wherein unit crystal layers are mutually stacked to form a layer structure. The "layer structure" is a structure wherein planes, each of which comprises atoms strongly bonded to each other on the basis of covalent bonds, etc., so as to form close packing, are stacked substantially parallel to each other on the basis of weak bonding power such as van der Waals' force.

Specific examples of the inorganic laminar compound may include graphite, phosphoric acid salt-type derivative compounds (such as zirconium phosphate-type compounds), chalcogen-type compounds, clay minerals, etc. The "chalcogen-type compound" used herein refers to a di-chalcogen type compound which comprises an element of Group IV (Ti, Zr, Hf), Group V (V, Nb, Ta), and Group VI (Mo, W), and is represented by a formula of $MX_2$. Here, M is an atom selected from Groups IV, V and VI and X is a chalcogen (S, Se, Te).

The clay minerals may be classified into two types, i.e., one type having a two-layer structure, that comprises a silica tetrahedral layer and an octahedral layer which is disposed thereon and comprises a central metal such as aluminum and magnesium; and another type having a three-layer structure, that comprises an octahedral layer comprising a central metal such as aluminum and magnesium, and a silica tetrahedral layer disposed on both sides of the octahedral layer so as to sandwich the octahedral layer.

Specific examples of the former two-layer type include kaolinite series, antigorite series, etc. Specific examples of the latter three-layer type include smectite series, vermiculite series, mica series, etc.

Examples of clay minerals to be used in the present invention include kaolinite, dickite, nacrite, halloysite, antigorite, chrysotile, pyrophyllite, montmorillonite, hectorite, tetrasilylic mica, sodium taeniolite, muscovite, margarite, talc, vermiculite, phlogopite, xanthophyllite, chlorite, etc.

In the resin composition constituting the GB layer, a weight ratio of the inorganic laminar compound to the resin is preferably in the range of 5/95–90/10, and more preferably in the range of 5/95–50/50, in view of thermal insulating efficiency and moldability.

In the preparation for a GB layer composed of a resin composition comprising a resin and an inorganic laminar compound, a resin, a solvent to which the resin is soluble and an inorganic laminar compound which can be moderately swollen or cleft with the solvent are preferably used in combination.

In view of economical efficiency, easiness of obtaining and gas barrier property of the GB layer, the aspect ratio (Z) of the inorganic laminar compound is preferably not less than 50 and not more than 5,000, and more preferably not less than 200 and not more than 3,000. In view of moldability, the particle size of the inorganic laminar compound is preferably 5 μm or less, and more preferably 3 μm or less.

Figure 1:
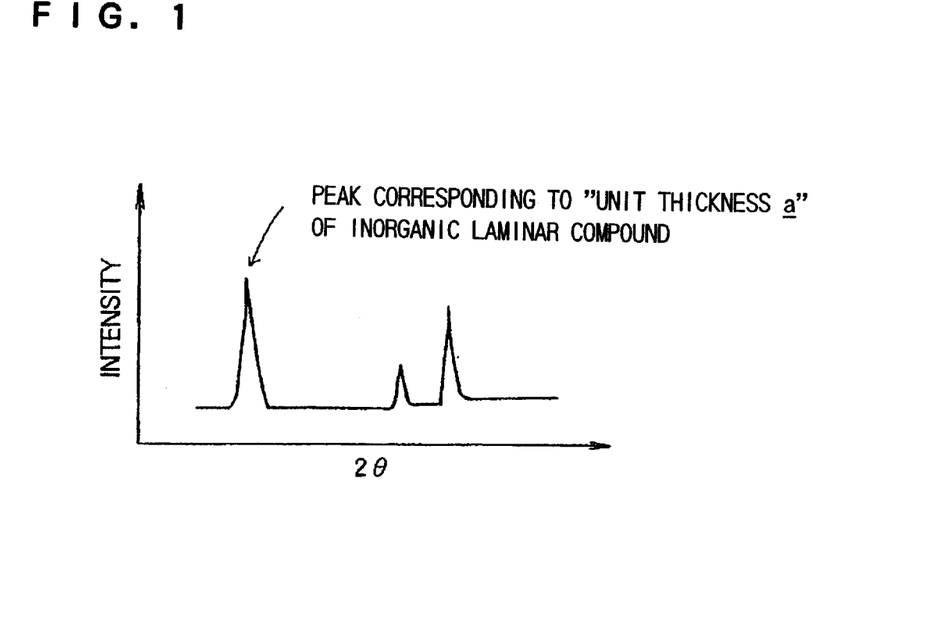
FIG. 1 is a graph schematically showing a relationship between an X-ray diffraction peak of an inorganic laminar compound and a "unit thickness a" of the compound.

The above-mentioned aspect ratio (Z) of the inorganic laminar compound is represented by the formula: Z=L/a, in which L is a particle size of the inorganic laminar compound determined by a dynamic light-scattering method by dispersing the inorganic laminar compound in a solvent and a is a unit thickness of the inorganic laminar compound which is determined by a powder X-ray diffraction analysis of a powder which is obtained by swelling or cleaving an inorganic laminar compound in a solvent completely and then removing the solvent. More specifically, as schematically shown in the graph of FIG. 1 wherein the abscissa denotes $2\theta$, and the ordinate denotes the intensity of X-ray diffraction peaks, the "unit thickness a" is a spacing obtained from the Bragg's equation ($n \cdot \lambda = 2D \cdot \sin \theta$, n=1, 2, 3 . . . ), wherein $\theta$ denotes the angle corresponding to the peak having the lowermost angle among those of the observed diffraction peaks. With respect to the details of the powder X-ray diffraction method, the book entitled "Kiki-Bunseki no Tebiki (Handbook on Instrumental Analysis) (a)", page 69, (1985), editorially supervised by Jiro SHIOKAWA, published by KAGAKU DOJIN K.K. may be referred to.

Figure 2:
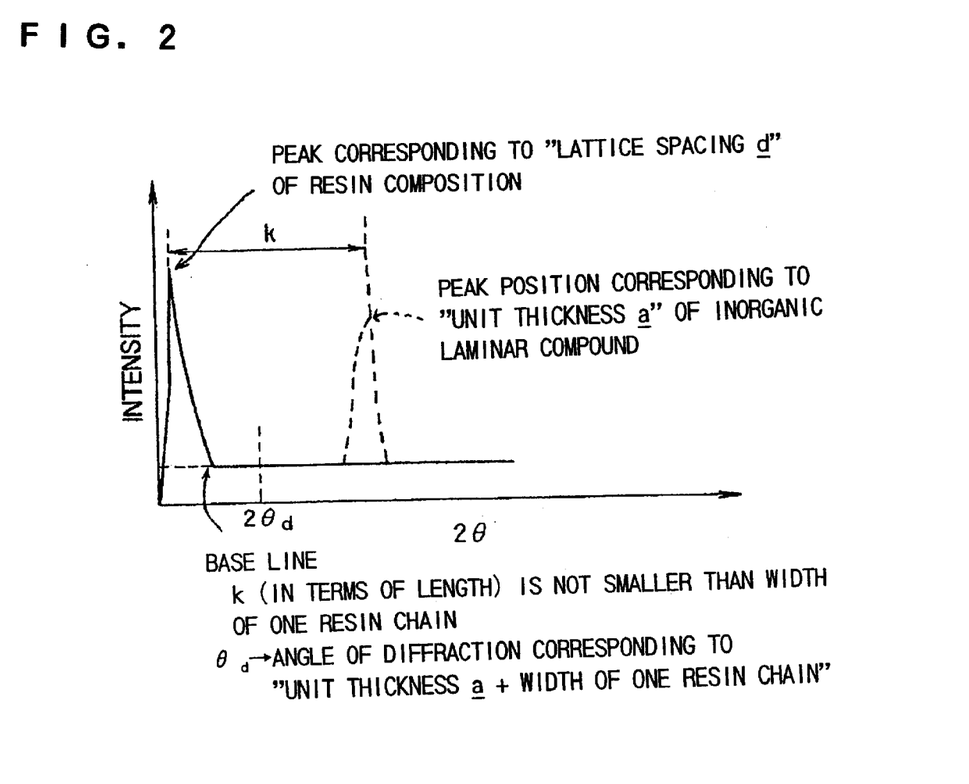
FIG. 2 is a graph schematically showing a relationship between an X-ray diffraction peak of a resin composition containing an inorganic laminar compound and a "lattice spacing (or distance between lattice planes) d" of the composition.
Figure 3:
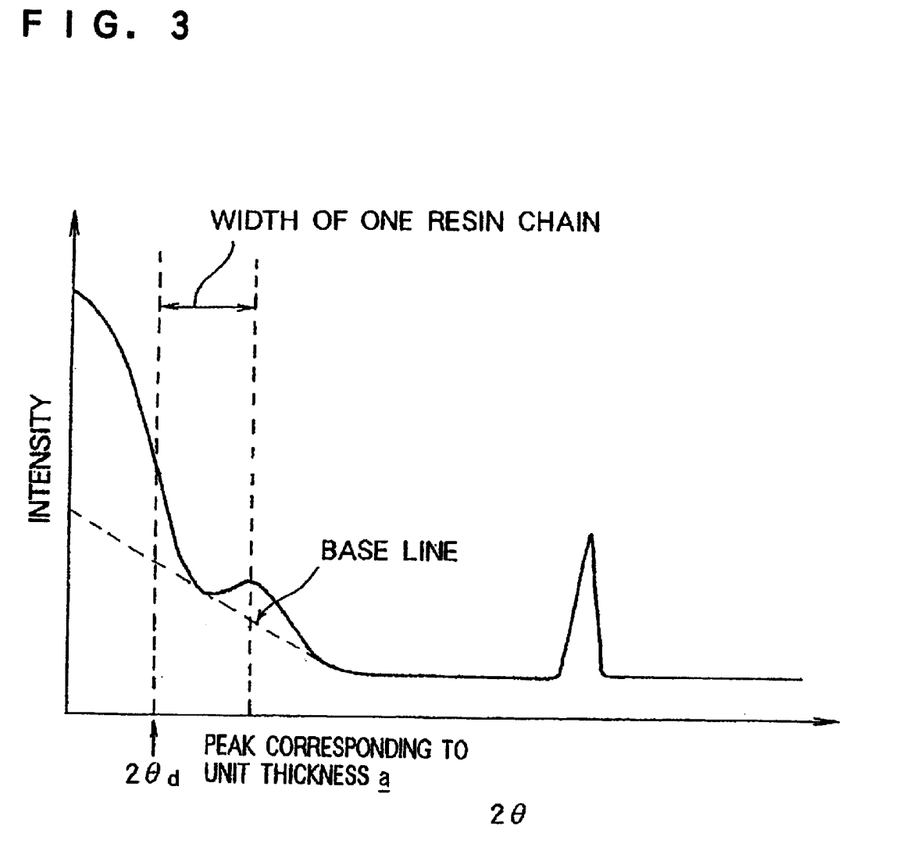
FIG. 3 is a graph schematically showing a relationship between an X-ray diffraction peak of a resin composition and a "lattice spacing d" of the composition, in a case where the peak corresponding to the lattice spacing d is superposed on halo (or background) and is difficult to detected. In this Figure, the area obtained by subtracting a "base line" portion from the peak area in the lower angle side below $2 \cdot \theta_d$ is treated as the peak corresponding to the "lattice spacing d"

A powder X-ray diffraction analysis of a resin composition containing an inorganic laminar compound can provide a lattice spacing, d, of the inorganic laminar compound in the resin composition. Specifically, as schematically shown in the graph of FIG. 2 wherein the abscissa denotes $2\theta$, and the ordinate denotes the intensity of X-ray diffraction peaks, the "lattice spacing d" (a<d is a spacing corresponding to the peak having the lowermost angle among the observed diffraction peaks appearing on the lower angle (larger spacing) side as compared to the position of the diffraction peak corresponding to the above-mentioned "unit thickness a". In a case where the above peak corresponding to the "lattice spacing d" is superposed on a halo (or background) as schematically shown in the graph of FIG. 3 so that it is difficult to detect such a peak, the area of a portion obtained by subtracting the base line portion from a portion corresponding to an angle lower than $2\theta_d$, is treated as a peak corresponding to the "lattice spacing d". The "$\theta_d$" used herein is an angle of diffraction corresponding to "(unit thickness a)+(width of one resin chain)". With respect to the details of a method of determining the "lattice spacing d", the book entitled "Nendo no Jiten (Encyclopedia of Clay)", page 35 et seq. and page 271 et seq., (1985), edited by Shuichi IWAO et al., published by ASAKURA SHOTEN K. K. may be referred to.

The integrated intensity of the diffraction peak (corresponding to the "lattice spacing d") observed in the powder X-ray diffraction of a resin composition preferably has a relative ratio of at least 2 (more preferably, at least 10), with respect to the integrated intensity of the diffraction peak as a standard (corresponding to the "unit thickness a". In general, the difference between the above lattice spacing d and the "unit thickness a", namely, the value of k=(d−a) (when converted into "length") may be equal to, or larger than the width of one resin chain constituting the resin composition (k=d−a)≧(width of one resin chain)). The "width of one resin chain" may be determined by simulation calculation, etc., as described in, e.g., the book entitled "KOBUNSHI KAGAKU JORON (Introduction to Polymer Chemistry)", pages 103–110 (1981), published by KAGAKU DOJIN K.K. In the case of polyvinyl alcohol, the width is 4–5 Å, and in the case of water molecules, the width is 2–3 Å.

In a case where there is a relationship of a<d between the lattice spacing d determined by the powder X-ray diffraction method for the resin composition and the "unit thickness a" determined by the powder X-ray diffraction method for the inorganic laminar compound alone; and the value of (d−a) is not smaller than the width of one resin chain in the resin composition, it is assumed that the resin is inserted between layers of the inorganic laminar compound.

For example, in the manufacture of a vacuum thermal insulator having a shell comprising a substrate layer and a GB layer, which is a representative embodiment of the present invention, the GB layer is often formed by applying a dispersion liquid containing an inorganic laminar compound and a resin to a substrate and then removing the dispersion medium therefrom. A solvent to which the resin is soluble is usually used as the dispersion medium. When a dispersion liquid in which the inorganic laminar compound is swollen or cleft with the dispersion medium is used, a GB layer which has particularly excellent gas barrier property can be formed. It is, therefore, preferable to use an inorganic laminar compound having such property that it can be swollen or cleft with the solvent to which the resin for the GB layer is soluble. The degree of swelling and that of cleavage of the inorganic laminar compound may be evaluated by the following "swelling property test" and "cleavage property test", respectively. The inorganic laminar compound may preferably have a swelling property of at least about 5 (more preferably, at least about 20) determined by the following swelling property test. On the other hand, the inorganic laminar compound may preferably have a cleavage property of at least about 5 (more preferably, at least about 20) determined by the following cleavage property test. When the inorganic laminar compound is a swellable natural clay mineral, it is preferable to use water as the solvent.

Swelling property test

Two grams of an inorganic laminar compound is added to 100 ml of a solvent and mixed, while 100-ml graduated cylinder is used as a container. The resultant mixture is left standing for about one day, and thereafter the volume of the former (the dispersion layer of the inorganic laminar compound) is read from the graduations corresponding to the interface between the dispersion layer of the inorganic laminar compound and the supernatant. The larger the resultant value is, the higher the swelling property in the solvent is.

Cleavage property test

Thirty grams of an inorganic laminar compound is slowly added to 1500 ml of a solvent, and is dispersed by means of a dispersion machine at 23° C. Thereafter, 100 ml of the resultant dispersion liquid is taken out and then is left standing for 60 minutes. Then, the volume of the dispersion layer of the inorganic laminar compound is read from the graduation corresponding to the interface between the dispersion layer of the inorganic laminar compound and the supernatant. The larger the volume is, the higher the cleaving property in the solvent is.

Although the solvent (dispersion medium) can be suitably chosen depending upon the types of the resin and the inorganic laminar compound to be used, examples of the solvent include water, alcohol such as methanol, dimethylformamide, dimethylsulfoxide and acetone. Among them, water and alcohol are often preferably used.

A method for preparing the resin composition comprising the above-mentioned inorganic laminar compound and a resin is not particularly limited. In view of dispersibility of the inorganic laminar compound in the resin and easiness in handling, it is possible to adopt, e.g., a method (first method) wherein a solution obtained by dissolving a resin in a solvent, and a dispersion obtained by previously swelling or cleaving, an inorganic laminar compound with the solvent, and mixed with each other, and thereafter the solvent is removed; a method (second method) wherein a dispersion obtained by swelling or cleaving an inorganic laminar compound with a solvent is added to a resin, and thereafter the solvent is removed; a method (third method) wherein an inorganic laminar compound is added to a solution obtained by dissolving a resin in a solvent to obtain a dispersion in which the inorganic laminar compound is swollen or cleft, and thereafter the solvent is removed; and a method (fourth method) wherein an inorganic laminar compound and a resin are kneaded under heating using a solvent. Lowering of the aspect ratio of the inorganic laminar compound in the manufacture of the resin composition can be efficiently suppressed by the former three methods. In the former three methods, the use of a high-pressure dispersing machine is preferable from the viewpoint of dispersion efficiency of the inorganic laminar compound.

Examples of the high-pressure dispersing machine include a superhigh-pressure homoginizer manufactured by Mcrofluidics Corporation (trade name: Microfluidizer), Nanomizer manufactured by Nanomizer K.K. and Mantongorin-type high-pressure dispersing machines such as Homogenizer manufactured by Izumifoodmachinary K.K.

Additionally, also in the GB layer in the vacuum thermal insulator, the inorganic laminar compound preferably has aspect ratios of 50–5,000, more preferably 200–3000, wherein the aspect ratio is defined as a ratio of the particle size to the unit thickness of the inorganic laminar compound in the resin composition.

The vacuum thermal insulator of the present invention has a shell having at least one GB layer and can attain high thermal insulation property by having a substantially vacuum space inside. When a plurality of GB layers contained in the shell, compositions of each GB layer may be either identical or different. Two or more GB layers may adjoin. Alternatively, one or more layers other than the GB layers may intervene between the GB layers.

Although one preferred example of the vacuum thermal insulator of the present invention is a vacuum thermal insulator having a shell containing at least one continuous GB layer without having any splits or holes, every GB layer in the shell may have a slit, gap and hole. However, in such a case, it is preferable that the defective part of the GB layer is covered with a material of high gas barrier property in view of thermal insulation property and maintainability in the property.

The vacuum thermal insulator of the present invention may have, inside the shell, a core material or a hollow structural body set forth below. Furthermore, the hollow structural body may have the core material inside.

The vacuum thermal insulator of the present invention preferably has the core material inside the shell. The core material is a material which is used for maintaining a desired size of the vacuum thermal insulator. The core material is not particularly limited in type unless it has a bad influence upon thermal insulation property. Ones having a heat conductivity measured by a procedure according to JIS R2618 of less than 0.1 W/m•K are preferred. The use of the core material which has spaces finely divided results in excellent thermal insulation property. Specific examples of the core material include perlite powder, silica powder, precipitated silica powder, glass wool, rock wool, foamed resin body having open cells and a honeycomb structural body of resin or metal.

If necessary, getters may be employed together with the core material. The getter also may be used as the core material.

The getter is a material which can absorb a gas such as carbon dioxide, oxygen, nitrogen and water vapor. Examples thereof include iron powder, resin molded article in the form of pellet or sheet containing iron powder, synthetic zeolite represented by molecular sieves, alloy getter such as zirconium-containing alloy and barium-lithium alloy. COMBOGETTER manufactured by Saes getter Co., Ltd. is one specific example of the alloy getter. With respect to zeolite-type getters, ones which have previously dehydrated by, for example, heating are preferred in view of the absorbing power. Synthetic zeolites having pores whose diameter is 8–13 Å are preferred.

The vacuum thermal insulator of the present invention may have a hollow structural body inside the shell. The hollow structural body is composed of a continuous wall which defines a substantially closed space. The configuration of the hollow structural body can be selected depending upon the desired configuration of the vacuum thermal insulator and is not particularly limited. The thickness of the wall is preferably 10 mm or less, more preferably 5 mm or less, and most preferably 1 mm or less. Although the material of the hollow structural body is not particularly limited, resins are preferred in view of thermal insulation property. The pressure of the space lying inside the hollow structural body is preferably 1 Torr or less, more preferably 0.1 Torr or less and most preferably 0.01 Torr or less.

The hollow structural body may have the above-mentioned core material and/or getter inside.

Examples of the resins which composes the hollow structural body include polyolefin resins such as low- or high-density polyethylene, ethylene/propylene copolymer, ethylene/butene copolymer, ethylene/hexene copolymer, ethylene/octene copolymer, polypropylene, ethylene/vinyl acetate copolymer, ethylene/methyl methacrylate copolymer and ionomer resins; polyester resins such as polyethylene terephthalate, polybutylene terephthalate and polyethylene naphthalate; amide resins such as Nylon-6, Nylon-6,6, m-xylenediamine/adipic acid polycondensate and polymethyl methacrylimide; acrylic resins such as polymethyl methacrylate; styrene or acrylonitrile base resins such as polystyrene, styrene/acrylonitrile copolymer, styrene/acrylonitrile/butadiene copolymer and polyacrylonitrile; hydrophobicized cellulose resins such as cellulose triacetate and cellulose diacetate; halogen-containing resins such as polyvinyl chloride, polyvinylidene chloride, polyvinylidene fluoride and Teflon; hydrogen bonding resins such as polyvinyl alcohol, ethylene/vinyl alcohol copolymer and cellulose derivatives; liquid crystal polymers such as liquid crystal polyester resin; and engineering plastics such as polycarbonate resins, polysulfone resins, polyethersulfone resins, polyether ether ketone resins, polyphenylene oxide resins, polymethylene oxide resins and aramid resins.

Figure 4:
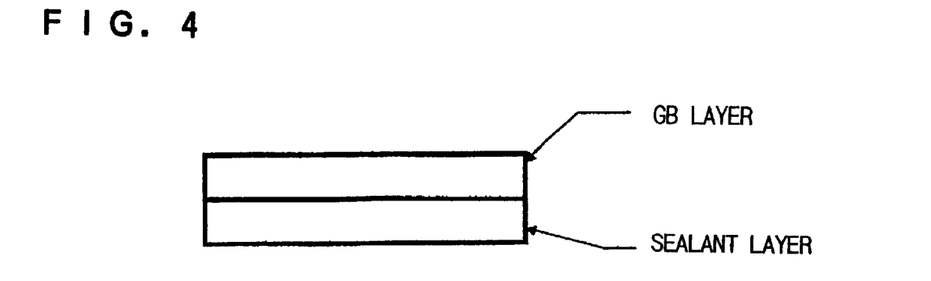
FIG. 4 is a schematic section of one example of a laminate which has a GB layer.
Figure 5:
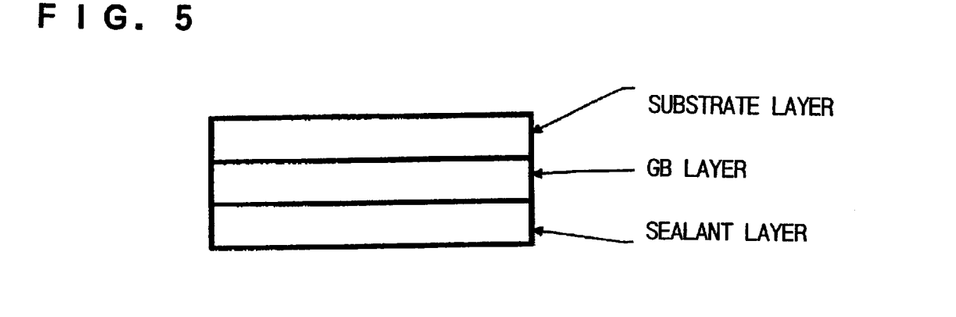
FIG. 5 is a schematic section of another example of a laminate which has a GB layer.

A structure of the shell is not particularly limited so long as at least one GB layer is contained therein. The shell may be, for example, a laminate which comprises a GB layer and a sealant layer as illustrated in FIG. 4 and a laminate which comprises a sealant layer, a substrate layer and a GB layer as illustrated in FIG. 5. In view of strength, the shell preferably has the substrate layer in addition to the GB layer.

Figure 6:
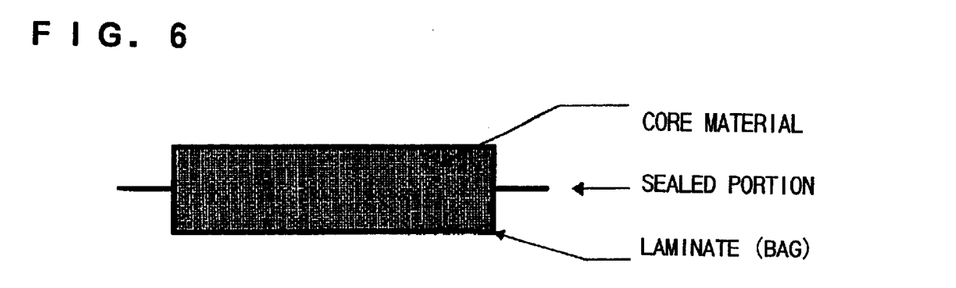
FIG. 6 is a schematic section of one example of a vacuum thermal insulator of the present invention.

The vacuum thermal insulator of the present invention may be one which is manufactured by preparing a bag which is composed of a laminate comprising a GB layer and a sealant layer, putting a core material and/or a hollow structural body into the bag, evacuating the bag and sealing the sealant layer together as shown in FIG. 6. The vacuum thermal insulator also may be a hollow molded body having a GB layer wherein the inside of the hollow molded body is filled with a core material and evacuated as shown in FIG. 7.

Figure 7:
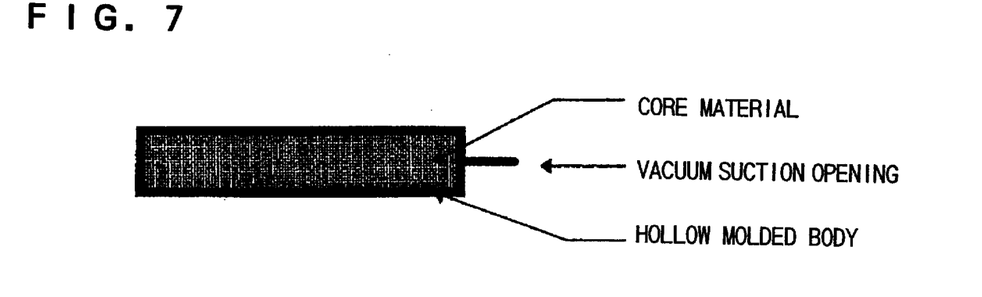
FIG. 7 is a schematic section of another example of a vacuum thermal insulator of the present invention.

The way of evacuation is not particularly limited and may be carried out by evacuating through a vacuum suction opening provided to a hollow molded body as shown in FIG. 7 and then sealing the opening.

The pressure of the space lying inside the shell is preferably 1 Torr or less in usual, more preferably 0.1 Torr or less, and most preferably 0.001 Torr or less in view of the suppression of lowering thermal insulation property due to a convection of gas inside the vacuum thermal insulator.

The shell preferably has at least one GB layer which satisfies the following formula (2):

$$1\times10^2 < V/(P\times S) < 5\times10^3 \qquad (3)$$

wherein S (cm$^2$) is the area of the outside surface of the GB layer, V (cm$^3$) is the space volume inside the shell and P has the same meaning as that in the formula (1).

The space volume inside the shell is a volume of the space lying inside the shell after the evacuation. If the vacuum thermal insulator has a core material inside the shell, V is a value which is calculated by subtracting the true volume occupied by the core material from the unobstructed capacity of the shell. The true volume occupied by the core material can be determined from the true specific gravity of the core material and the total weight of the core material used. If the vacuum thermal insulator has a hollow structural body inside the shell, V is a value which is calculated by subtracting the total volume of the wall forming the hollow structural body from the unobstructed capacity of the shell. If the hollow structural body has the core material and the like inside, V is a value which is calculated by subtracting the total volume of the wall forming the hollow structural body and the true volume occupied by core material and the like from the unobstructed capacity of the shell. S can be determined by using the weight, apparent specific cavity and thickness of the GB layer.

In a case where the shell has a substrate layer, a material of the substrate layer preferably has a heat conductivity as low as possible in view of suppression of heat bridging. Considering the moldability, resins are preferably used. Examples of resins for the substrate layer include polyolefin resins such as low- or high-density polyethylene, ethylene/propylene copolymer, ethylene/butene copolymer, ethylene/hexene copolymer, ethylene/octene copolymer, polypropylene, ethylene/vinyl acetate copolymer, ethylene/methyl methacrylate copolymer and ionomer resins; polyester resins such as polyethylene terephthalate, polybutylene terephthalate and polyethylene naphthalate; amide resins such as Nylon-6, Nylon-6,6, m-xylenediamine/adipic acid polycondensate and polymethyl methacrylimide; acrylic resins such as polymethyl methacrylate; styrene or acrylonitrile base resins such as polystyrene, styrene/acrylonitrile copolymer, styrene/acrylonitrile/butadiene copolymer and polyacrylonitrile; hydrophobicized cellulose resins such as cellulose triacetate and cellulose diacetate; halogen-containing resins such as polyvinyl chloride, polyvinylidene chloride, polyvinylidene fluoride and Teflon; hydrogen bonding resins such as polyvinyl alcohol, ethylene/vinyl alcohol copolymer and cellulose derivatives; and engineering plastics such as polycarbonate resins, polysulfone resins, polyethersulfone resins, polyether ether ketone resins, polyphenylene oxide resins, polymethylene oxide resins, liquid crystal polyester resins and aramid resins. Among these resins, liquid crystal polyester resins, aramid resins, biaxially oriented polypropylene, biaxially oriented polyethylene terephthalate, and biaxially oriented Nylon are preferred. In addition, films obtained by coating the above-mentioned biaxially oriented resins with polyvinylidene chloride and deposited films of the biaxially oriented resins such as an aluminium-, alumina- or silica- deposited film are preferably used.

When the shell has a sealant layer, the sealant layer is usually composed of resin. Such resin is not particularly limited, and examples thereof include polyolefin resins, e.g., low- or high-density polyethylene, ethylene/polyvinyl alcohol copolymer, ethylene/propylene copolymer, ethylene/butene copolymer, ethylene/hexene copolymer, ethylene/4-methyl-1-pentene copolymer, ethylene/octene copolymer, polypropylene, ethylene/vinyl acetate copolymer,. ethylene/methyl methacrylate copolymer, ethylene/methyl acrylate copolymer, ethylene/acrylic acid copolymer and ionomer resins; polyamide resins such as Nylon-6 and Nylon-6,6; styrene/acrylonitrile/butadiene copolymer; styrene/acrylonitrile copolymer; polyacrylonitrile and polyacrylates such as polymethylmethacrylate.

The above-mentioned laminates can be manufactured by conventional lamination method such as a dry-lamination method and a coating method. For example, in order to form a GB layer of a resin composition comprising an inorganic laminar compound and polyvinyl alcohol on a substrate layer, a dispersion liquid obtained by dispersing the inorganic laminar compound in aqueous polyvinyl alcohol may be applied to the substrate layer, followed by drying it.

In order to attain satisfactory adhesion strength between layers contained in the laminate, each layer may be subjected to treatments such as corona treatment, ozone treatment, electron beam treatment and anchor coating.

The above-mentioned GB layer, substrate layer and sealant layer may be incorporated with various additives which are conventionally incorporated to resins such as ultraviolet absorbers, colorants and antioxidants, unless the effect of the present invention is damaged.

In view of thermal insulation property, such a vacuum thermal insulator that its heat conductivity is 0.005 kcal/m•hr•° C. or less when the pressure in the space lying inside the shell is particularly preferred.

The vacuum thermal insulator of the present invention may have a detector for measuring the degree of vacuum. The detector may be a soft urethane foam having a high impact resilience modulus, and so on.

The vacuum thermal insulator of the present invention can be manufactured, for example, by using a multi-layered film having at least one GB layer and at least one sealant layer. For example, the vacuum thermal insulator can be manufactured by folding a multi-layered film into two so that the sealant layers face each other, supplying a core material between the sealant layers, sealing the sealant layers along the periphery of the core material, and evacuating. Another type of vacuum thermal insulator can be produced by supplying a core material between two multi-layered which are placed so that their sealant layers face each other, sealing the sealant layers along the periphery of the core material and evacuating. Still another type of vacuum thermal insulator can be produced by supplying a core material into a tubular inflation film whose innermost layer is a sealant layer, sealing the both open end of the tube and evacuating. In the above-mentioned processes, a hollow structural body may be used in place of or together with the core material.

The way of sealing is not particularly limited and conventional sealing methods such as welding by radiofrequency heating, sealing with pressure, heat sealing (sealing with pressure and heat) and adhering with adhesives. Among these ways, heat sealing is preferred in view of sealing strength and so on.

A sealed portion in the vacuum thermal insulator preferably satisfies the relationship of H/d>20 wherein a (mm) is the thickness of the sealant layer and H (mm) is the width of the sealed portion. When the value of H/d is more than 20, the permeation of gas along the sealed surface can be efficiently prevented. It is so desirable that the value of H/d is large in view of gas barrier property. The value of H/d is preferably $1 \times 10^2$ or more and more preferably $1 \times 10^3$.

Although the values of H and d may be set so that the above formula is satisfied, d is preferably 0.2 mm or less, more preferably 0.05 mm or less and most preferably 0.04 mm or less. H is preferably 10 mm or more and more preferably 20 mm or more.

The vacuum thermal insulator of the present invention which has good thermal insulation property and can maintain the property for a long time can be utilized as a thermal insulator which is incorporated into walls of a refrigerator, freezing chamber and the like. The vacuum thermal insulator also can be used as construction materials for a ceiling, wall, floor and the like.

Furthermore, the vacuum thermal insulator of the present invention can be employed for various uses which require thermal insulation such as for keeping cold or for keeping warm. Specific examples of uses of the vacuum thermal insulator include a refrigerator, a freezing chamber, a cold reserving car, a ceiling of a vehicle, a battery, a refrigerated ship, a freezing ship, a heat retaining container, a freezing showcase, a cold reserving showcase, a portable cold-reserving box, a heat retaining showcase for cooking, a vending machine, a solar water heater, a floor heating device, construction materials for an attic, plant equipment such as hot- or cold-water pipes and cold fluid transfer pipes, clothes and bedclothes.

The present invention will be explained in detail by the following examples which should not be construed to limit the scope of the invention.

Methods for measuring physical properties are as follows

Heat conductivity

Heat conductivity of a GB layer was measured according to JIS R 2618. When the GB layer was thin, the GB layer having a thickness of W (m) was laminated on an adequate substrate layer having a thickness of $L_B$ (m) and a heat conductivity of $\lambda_B$ to form a laminate. The laminate was measured its thickness, $L_t$ (m), and heat conductivity, $\lambda_t$. Using the values of W, $L_B$, $\lambda_B$, $L_t$, and $\lambda_t$, the heat conductivity of the GB layer was calculated according to the following formula:

$$L_t/\lambda_t = W/\lambda + L_B/\lambda_B$$

Heat conductivity of the vacuum thermal insulator was measured according to JIS A 1412.

Oxygen permeability

Oxygen permeability was measured by using an oxygen permeability measuring apparatus (trade name: OX-TRAN 100; manufactured by MOCON Co.) at 23° C. in a humidity of 50% RH.

Thickness

A thickness of at least 0.5 µm was measured by a commercially available digital-type thickness measuring device (contact-type thickness measuring device; trade name: Ultra-High Precision Deci-Micro Head MH-15M; manufactured by Nihon Kogaku Co.).

On the other hand, a thickness of less than 0.5 µm was determined by a gravimetric analysis method wherein the weight of a film having a predetermined area was measured, the resultant weight was divided by the area, and further divided by the specific gravity of the composition; or, in the case of a laminate comprising a gas barrier resin composition layer and a substrate layer, an elemental analysis method wherein the ratio between the thickness of the resin composition layer and that of the substrate layer was determined from the ratio between the analytical value of a predetermined inorganic element (originating from the composition) of the laminate and the fraction of the inorganic laminar compound alone.

Particle size

A particle size was measured by using a ultrafine particle size analyzing apparatus (trade name: BI-90; manufactured by Brookheaven Co.) at a temperature of 25° C. in a water solvent. The particle size, L, was determined as a central particle diameter measured by a photon correlation method based on a dynamic light-scattering method.

Aspect ratio

X-ray diffraction patterns were obtained by the powder method using an X-ray diffraction meter (trade name: XD-5A; manufactured by Shimadzu Corporation) with the inorganic laminar compound alone and the resin composition containing the inorganic laminar compound. The lattice spacing (unit thickness) "a" of the inorganic laminar compound was calculated from the X-ray diffraction pattern. It was confirmed from the X-ray diffraction pattern for the resin composition that the lattice spacing of the inorganic laminar compound was widened in some parts. By using the particle size, L, obtained by the above-mentioned method, the aspect ratio, Z, was calculated by using a formula of Z=L/a.

Heat sealing condition

Unless otherwise stated, he at sealing was carried out under conditions of: a temperature of 208° C., for 0.5 seconds, and with a heat-sealing width of 10 mm, by using a heat sealer (trade name: FUJI IMPULSE T230; manufactured by FUJI IMPULSE CO., LTD.).

Preparation of coating liquid No. 1

Into a dispersion vessel (trade name: DESPA MH-L; manufactured by ASADA Iron Works Co.), 980 g of ion-exchange water (electric conductivity: 0.7 µS/cm or less) and 20 g of polyvinyl alcohol (trade name: PVA 103; manufactured by Kuraray Co., Ltd.; saponification degree: 98.5%; polymerization degree: 300) were placed and heated to 95° C. with stirring at a low speed (1500 rpm; circumferential speed: 4.10 m/min). The resultant mixture was stirred at that temperature for one hour to provide the resin solution (A). Separately, powder of synthetic smectite (trade name: Smectone SA; manufactured by Kunimine Industries Co., Ltd.) was added to a mixture of 980 g of ion-exchange water and 20 g of polyvinyl alcohol in the dispersion vessel, and the resultant mixture was stirred at a high speed (3100 rpm; circumferential speed: 8.47 m/min) for 90 minutes to produce the solution (B) having a solid content of 2% by weight. The solutions (A) and (B) were mixed in a weight ratio of (A) to (B) of 1/2 and stirred to produce the mixed resin composition liquid (C) having a total solid content of 2% by weight.

To the liquid (C), a silicone-type surfactant (trade name: SH3746; manufactured by Dow Corning Toray Silicone Co., Ltd.) was added in an amount of 0.01% by weight based on the total weight of the liquid (C) to provide the coating liquid No. 1.

EXAMPLE 1

An anchor coating agent (E) (a mixture of ADCOAT AD335 and CAT10 having a mixing ratio of 15/1 (weight ratio); manufactured by TOYO MORTON Co. Ltd.) was gravure-coated on a 12 µm thick biaxially oriented PET manufactured by Toray Industries, Inc., which was a substrate film, by a microgravure-coat method using a test coater manufactured by Yasui Seiki (coating speed: 3 m/min; drying temperature: 80° C). The thickness of the resultant anchor coating layer after dry was 0.15 µm. A biaxially oriented PET film having a resin-containing gas barrier layer (GB layer) was produced by gravure-coating the coating liquid No. 1 on the anchor coating layer by a microgravure-coat method using a test coater manufactured by Yasui Seiki (coating speed: 6 m/min; drying temperature: 100° C.). The GB layer had a heat conductivity of 0.24 W/m•K and a thickness after dry of 0.4 µm.

On the GB layer in the resultant biaxially oriented PET film, a surface-corona-treated linear polyethylene (LLDPE) (manufactured by Kan Fil Co.; thickness: 40 µm) was dry-laminated using a urethane-based adhesive (trade name: Unoflex J3; manufactured by Sanyo Chemical Industries, Ltd.) to produce a laminate film. An oxygen permeability of the GB layer in the laminated film was measured. The result is given in Table 1.

Referential Example 1

A bag 250 mm long and 250 mm wide was prepared by sealing LLDPE layers (inner layers) of two films obtained from the laminated film produced in Example 1 together at their three sides. The bag is filled with perlite, which is a core material, manufactured by MITSUI MINING & SMELTING CO., LTD. and evacuated to 0.01 Torr. The bag is then sealed at its unsealed side to produce a vacuum thermal insulator. The thus obtained vacuum thermal insulator has extremely low heat conductivity and can exhibit good thermal insulation property. The thermal insulation property hardly deteriorates dung aging.

Comparative Example 1

An anchor coating agent (E) (a mixture of ADCOAT AD335 and CAT10 having a mixing ratio of 15/1 (weight ratio); manufactured by TOYO MORTON Co. Ltd.) was gravure-coated on a 12 µm thick biaxially oriented PET manufactured by Toray Industries, Inc., which was a substrate film, by a microgravure-coat method using a test coater manufactured by Yasui Seiki (coating speed: 3 m/min; drying temperature; 80° C). The thickness of the resultant anchor coating layer after dry was 0.15 µm. A biaxially oriented PET film having a resin-containing layer was produced by gravure-coating a polyvinylidene chloride emulsion (trade name: Kureharon D888; manufactured by Kureha Chemical Industry Co., Ltd.) on the anchor coating layer by a microgravure-coat method using a test coater manufactured by Yasui Seiki (coating speed: 6 m/min; drying temperature: 100° C.). The resin-containing layer in the film had a heat conductivity of 0.24 W/m•K and a thickness after dry of 3 µm.

On the resin-containing layer in the resultant biaxially oriented PET film, a surface-corona-treated linear polyethylene (LLDPE) (manufactured by Kan Fil Co.; thickness: 40 µm) was dry-laminated using a urethane-based adhesive (trade name: Unoflex J3; manufactured by Sanyo Chemical Industries, Ltd.) to produce a laminate film. An oxygen permeability of the resin-containing layer in the laminated film was measured. The result is given in Table 1.

Comparatative Referential Example 1

A vacuum thermal insulator can be obtained in the same way as disclosed in Referential Example 1 using two films obtained from the laminated film produced in Comparative example 1. Thermal insulation property of the resultant vacuum thermal insulator deteriorates during aging.

TABLE 1

| | Oxygen permeability (cc/atm · m$^2$ · day) (at 23° C., 50% RH) | W · λ · P |
|---|---|---|
| Example 1 | 0.1 or less | $9 \times 10^{-9}$ or less |
| Comparative Example 1 | 8.0 | $5.5 \times 10^{-6}$ |

Preparation of coating liquid No. 2

Into a dispersion vessel (trade name: DESPA MH-L; manufactured by ASADA Iron Works Co.), 2800 g of ion-exchange water (electric conductivity: 0.7 S/cm or less) and 200 g of polyvinyl alcohol (trade name: PVA 117H; manufactured by Kuraray Co., Ltd.; saponification degree: 99.6%; polymerization degree: 1700) were placed and heated to 95° C. with stirring at a low speed (1500 rpm; circumferential speed: 4.10 m/min) so that polyvinyl alcohol was dissolved. The resultant mixture was cooled to 40° C. while stirring and 188 g of 1-butanol and 563 g of isopropylalcohol were added thereto, followed by stirring sufficiently. The resultant mixture was then heated to 60° C. under stirring and 100 g of powdery natural montmorillonite (trade name: Kunipia G; manufactured by Kunimine Industries Co., Ltd.) was added to the mixture. After making sure that the montmorillonite has thoroughly precipitated in the liquid, the mixture was stirred at a high speed (3100 rpm; circumferential speed: 8.47 m/min) for 90 minutes to produce the solution (D) having a total solid content of 8% by weight. The liquid (D) was passed through a high-pressure dispersing machine (trade name: Superhigh Pressure Homogenizer M100-E/H; manufactured by Microfluidics Corporation) and treated once at 1750 kgf/cm$^2$ to produce a uniform dispersion liquid (F) containing polyvinyl alcohol (PVA) and montmorillonite. The liquid (F) was casted to form a film and subjected to an X-ray analysis. The basal spacing of the montmorillonite was determined to be 41.2 Å from a peak observed and the montmorillonite was sufficiently cleft. The particle size of the montmorillonite (Kunipia G) determined by a dynamic light-scattering method was 560 nm. The unit thickness "a" determined by a powder X-ray diffraction was 1.2156 nm. The aspect ratio (Z) was 461.

To the liquid (F), 0.38 g of silicone-type surfactant (trade name: SH3746; manufactured by Dow Corning Toray Silicone Co., Ltd.) was added to provide the coating liquid No. 2.

EXAMPLE 2

An anchor coating agent (E) (a mixture of ADCOAT AD)335 and CAT10 having a mixing ratio of 15/1 (weight ratio); manufactured by TOYO MORTON Co. Ltd.) was gravure-coated on a 12 µm thick biaxially oriented polypropylene (OPP) film (trade name: Pylene P2102; manufactured by TOYOBO CO., LTD.), which had been subjected to a surface-corona treatment, by a microgravure-coat method using a test coater manufactured by Yasui Seiki (coating speed: 3 m/min; drying temperature: 80° C). The thickness of the resultant anchor coating layer after dry was 0.15 µm. A coated film was produced by gravure-coating the coating liquid No. 2 on the anchor coating layer by a microgravure-coat method using a test coater manufactured by Yasui Seiki (coating speed: 6 m/min; drying temperature: 100° C.). The coating layer had a thickness after dry of 0.5 µm.

On the coating layer in the coated film obtained above, a surface-corona-treated linear polyethylene (LLDPE)

(manufactured by Kan Fil Co.; thickness: 40, μm) was dry-laminated using a urethane-based adhesive (trade name. Unoflex J3; manufactured by Sanyo Chemical Industries, Ltd.) to produce a laminate film. An oxygen permeability of the laminated film was measured. The result is given in Table 2.

Referential Example 2

A bag 250 mm long and 250 mm wide was prepared by sealing LLDPE layers (inner layers) of two films obtained from the laminated film produced in Example 2 together at their three sides. The bag is filled with perlite, which is a core material, manufactured by MITSUI MINING & SMELTING GO., LTD. and evacuated to 0.01 Torr. After that, the bag is sealed by welding at its unsealed side to produce a vacuum thermal insulator. The thus obtained vacuum thermal insulator has extremely low heat conductivity and can exhibit good thermal insulation property. The thermal insulation property hardly deteriorates during aging.

Comparative Example 2

Carrying out dry-lamination of a gas barrier layer of EVOH-F (manufactured by Kuraray Co., Ltd.; thickness: 15 μm) onto one side of a biaxially oriented PET (a substrate film) using a urethane-based adhesive (trade name: Unoflex J3; manufactured by Sanyo Chemical Industries, Ltd.) and dry-lamination of a surface-corona-treated LLDPE (manufactured by Kan Fil Co.; thickness: 40 μm) (inner layer) onto the other side of the biaxially oriented PET gave a laminated film. An oxygen permeability of the laminated film was measured. The result is given in Table 2.

Comparative referential example 2

A vacuum thermal insulator can be obtained in the same way as disclosed in Referential Example 2 using two films obtained from the laminated film produced in Comparative Example 2. The thermal insulation property of the vacuum thermal insulator drastically deteriorates during aging.

TABLE 2

|  | Oxygen permeability (cc/atm · m² · day) (50% RH) | | |
| --- | --- | --- | --- |
|  | 23° C. | 55° C. | 80° C. |
| Example 2 | 0.1 or less | 0.1 or less | 0.1 or less |
| Comparative Example 2 | 0.3 | 12 | 31 |

Preparation of coating liquid No. 3

Into a dispersion vessel (trade name: DESPA DM-L; manufactured by ASADA Iron Works Co.), 3551 g of ion-exchange water (electric conductivity: 0.7 μS/cm or less) and 200 g of polyvinyl alcohol (trade name: PVA 117H; manufactured by Kuraray Co., Ltd.; saponification degree: 99.6%; polymerization degree: 1700) were placed and heated to 95° C. with stirring at a low speed (1500 rpm; circumferential speed: 4.10 m/min) so that polyvinyl alcohol was dissolved. The resultant mixture was then heated to 60° C. under stirring and 100 g of powdery natural montmorillonite (trade name: Kunipia G; manufactured by Kunimine Industries Co., Ltd.) was added to the mixture. After making sure that the montmorillonite has thoroughly precipitated in the liquid, the mixture was stirred at a high speed (3100 rpm; circumferential speed: 8.47 m/min) for 90 minutes to produce the solution (G) having a total solid content of 8% by weight.

The liquid (G) was casted to form a film and subjected to an X-ray analysis. The basal spacing of the montmorillonite was determined to be 41.2 Å from a peak observed and the montmorillonite was sufficiently cleft. The particle size of the montmorillonite (Kunipia G) determined by a dynamic light-scattering method was 560 nm. The unit thickness "a" determined by a powder X-ray diffraction was 1.2156 nm. The aspect ratio (Z) was 461.

To the liquid (G), 0.38 g of silicone-type surfactant (trade name: SH3746; manufactured by Dow Corning Toray Silicone Co., Ltd.) was added to provide the coating liquid No. 3.

EXAMPLE 3

An anchor coating agent (E) (a mixture of ADCOAT AD335 and CAT10 having a mixing ratio of 15/1 (weight ratio); manufactured by TOYO MORTON Co. Ltd.) was gravure-coated on a 20 μm in thick biaxially oriented polypropylene (trade name: Pylene P2102; manufactured by TOYOBO CO. LTD.), which had been subjected to a surface-corona treatment, by a microgravure-coat method using a test coater manufactured by Yasui Seiki (coating speed: 3 m/min; drying temperature: 80° C). The thickness of the resultant anchor coating layer after dry was 0.15 μm. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 μm.

On the coating layer in the coated film obtained above, a surface-corona-treated LLDPE (trade name: KF101; manufactured by Kan Fil Co.; thickness: 40 μm) was dry-laminated using a urethane-based adhesive (trade name; Unoflex J3; manufactured by Sanyo Chemical Industries, Ltd.) to produce a laminate film.

Referential Example 3

A bag 250 mm long and 250 mm wide was prepared by sealing LLDPE layers (inner layers) of two films obtained from the laminate film produced in Example 3 together at their three sides. The bag is filled with 100% open urethane foam having an average cell diameter of 75 μm (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 4

An anchor coating agent (E) (a mixture of ADCOAT AD335 and CAT10 having a miff ratio of 15/1 (weight ratio); manufactured by TOYO MORTON Co. Ltd.) was gravure-coated on a 12 μm thick biaxially oriented polyethylene terephthalate (trade name; Lumilar Q27; manufactured by Toray Industries Inc.), which had been subjected to a surface-corona treatment, by a microgravure-coat method using a test coater manufactured by Yasui Seiki (coating speed: 3 m/min; drying temperature: 80° C.). The thickness of the resultant anchor coating layer after dry was 0.15 μm. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 μm.

On the coating layer in the coated film obtained above, a surface-corona-treated LLDPE (trade name: KF101; manufactured by Kan Fil Co.; thickness: 80 μm) was dry-laminated using a urethane-based adhesive (trade name: Unoflex J3; manufactured by Sanyo Chemical Industries, Ltd.) to produce a laminated film.

Referential Example 4

A bag 250 mm long and 250 mm wide was prepared by sealing LLDPE layers (inner layers) of two films obtained from the laminate film produced in Example 4 together at their three sides. The bag is filled with 100% open urethane foam having an average cell diameter of 75 μm (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 5

An anchor coating agent (E) (a mixture of ADCOAT AD335 and CAT10 having a mixing ratio of 15/1 (weight ratio); manufactured by TOYO MORTON Co. Ltd.) was gravure-coated on an alumina-deposited surface of a 12 μm thick aluminium-deposited biaxially oriented polyethylene terephthalate (trade name: VM-PET, E7075; manufactured by TOYOBO CO., LTD.) by a microgravure-coat method using a test coater manufactured by Yasui Seiki (coating speed: 3 m/min; drying temperature: 80° C.). The thickness of the resultant anchor coating layer after dry was 0.15 μm. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 μm.

On the coating layer in the coated film obtained above, a surface-corona-treated LLDPE (trade name: KF101; manufactured by Kan Fil Co.; thickness: 80 μm) was dry-laminated using a urethane-based adhesive (trade name: Unoflex J3; manufactured by Sanyo Chemical Industries, Ltd.) to produce a laminated film.

Referential Example 5

A bag 250 mm long and 250 mm wide was prepared by sealing LLDPE layers (inner layers) of two films obtained from the laminate film produced in Example 5 together at their three sides. The bag is filled with 100% open urethane foam having an average cell diameter of 75 μm (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 6

An anchor coating agent (E) (a mixture of ADCOAT AD335 and CAT10 having a mixing ratio of 15/1 (weight ratio); manufactured by TOYO MORTON Co. Ltd.) was gravure-coated on a silica-deposited surface of a 12 μm thick silica-deposited biaxially oriented polyethylene terephthalate (trade name: Techbarrier S; manufactured by Mitsubishi Chemical Corporation) by a microgravure-coat method using a test coater manufactured by Yasui Seiki (coating speed: 3 m/min; drying temperature: 80° C.). The thickness of the resultant anchor coating layer after dry was 0.15 μm. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 μm.

On the coating layer in the coated film obtained above, a surface-corona-treated LLDPE (trade name: KF10; manufactured by Kan Fil Co.; thickness: 80 μm) was dry-laminated using a urethane-based adhesive (trade name: Unoflex J3; manufactured by Sanyo Chemical Industries, Ltd.) to produce a laminate film.

Referential Example 6

A bag 250 mm long and 250 mm wide was prepared by sealing LLDPE layers (inner layers) of two films obtained from the laminate film produced in Example 6 together at their three sides. The bag is filled with 100% open urethane foam having an average cell diameter of 75 μm (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 7

An anchor coating agent (E) (a mixture of ADCOAT AD335 and CAT10 having a mixing ratio of 15/1 (weight ratio); manufactured by TOYO MORTON Co. Ltd.) was gravure-coated on a corona-treated surface of a 12 t m thick biaxially oriented polyethylene terephthalate (trade name: Lumilar Q27; manufactured by Toray Industries Inc.) by a microgravure-coat method using a test coater manufactured by Yasui Seiki (coating speed: 3 m/min; drying temperature: 80 ° C.). The thickness of the resultant anchor coating layer after dry was 0.15 μm. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 μm.

On the coating layer in the coated film obtained above, a deposited CPP (trade name: VM-CPP, FKB; manufactured by Meiwa Packs Co.; thickness: 60 μm) was dry-laminated using a urethane-based adhesive (trade name: Unoflex J3; manufactured by Sanyo Chemical Industries, Ltd.) to produce a laminate film.

Referential Example 7

A bag 250 mm long and 250 mm wide was prepared by sealing LLDPE layers (inner layers) of two films obtained from the laminate film produced in Example 7 together at their three sides. The bag is filled with 100% open urethane foam having an average cell diameter of 75 μm (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 8

An anchor coating agent (E) (a mixture of ADCOAT AD335 and CAT10 having a mixing ratio of 15/1 (weight ratio); manufactured by TOYO MORTON Co. Ltd.) was gravure-coated on a silica-deposited surface of a 12 $\mu$m thick silica-deposited biaxially oriented polyethylene terephthalate (trade name: Techbarrier S; manufactured by Mitsubishi Chemical Corporation) by a microgravure-coat method using a test coater manufactured by Yasui Seiki (coating speed: 3 m/min; drying temperature: 80° C.). The thickness of the resultant anchor coating layer after dry was 0.15 $\mu$m. A coated film was produced by gravure-coating the coating liquid No. 3 on the anchor coating layer by a microgravure-coat method using a test coater manufactured by Yasui Seiki (coating speed: 6 m/min; drying temperature: 100° C.). The coating layer had a thickness after dry of 0.5 $\mu$m.

On the coating layer in the coated film obtained above, a deposited CPP (trade name: VM-CPP, FKB; manufactured by Meiwa Packs Co.; thickness: 60 $\mu$m) was dry-laminated using a urethane-based adhesive (trade name: Unoflex J3; manufactured by Sanyo Chemical Industries, Ltd.) to produce a laminated film.

Referential Example 8

A bag 250 mm long and 250 mm wide was prepared by sealing LLDPE layers (inner layers) of two films obtained from the laminate film produced in Example 8 together at their three sides. The bag is filled with 100% open urethane foam having an average cell diameter of 75 $\mu$m (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

EXAMPLE 9

An anchor coating agent (E) (a mixture of ADCOAT AD335 and CAT10 having a mixing ratio of 15/1 (weight ratio); manufactured by TOYO MORTON Co. Ltd.) was gravure-coated on a silica-deposited surface of a 12 $\mu$m thick silica-deposited biaxially oriented polyethylene terephthalate (trade name: Techbarrier S; manufactured by Mitsubishi Chemical Corporation) by a microgravure-coat method using a test coater manufactured by Yasui Seiki (coating speed: 3 m/min; drying temperature: 80° C.). The thickness of the resultant anchor coating layer after dry was 0.15 $\mu$m. A coated film was produced by gravure-coating the coating liquid No. 3 on the anchor coating layer by a microgravure-coat method using a test coater manufactured by Yasui Seiki (coating speed: 6 m/min; drying temperature: 100° C). The coating layer had a thickness after dry of 0.5 $\mu$m.

On the coating layer in the coated film obtained above, an aluminium foil (manufactured by SHOWA ALUMINUM CORPORATION; thickness: 60 $\mu$m) was dry-laminated using a urethane-based adhesive (trade name: Unoflex J3; manufactured by Sanyo Chemical Industries, Ltd.) so as not to cover a heat sealing portion, and subsequently, a surface-corona-treated LLDPE (trade name: KF101; manufactured by Kan Fil Co.; thickness: 80 $\mu$m) was laminated on the coating layer to produce a laminate film.

Referential Example 9

A bag 250 mm long and 250 mm wide was prepared by sealing LLDPE layers (inner layers) of two films obtained from the laminate film produced in Example 9 together at their three sides. The bag is filled with 100% open urethane foam having an average cell diameter of 75 $\mu$m (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side using a vacuum sealer (manufactured by NPC Co.) so that the inner pressure becomes 0.01 Torr to produce a vacuum thermal insulator. The thus obtained vacuum thermal insulator has extremely low heat conductivity and the thermal insulation property hardly deteriorates during aging.

Comparative Example 3

Carrying out dry-lamination of a gas barrier layer composed of a polyvinylidene chloride film (trade name: Saran UB; manufactured by Asahi Chemical Industry Co., Ltd.; thickness: 15 $\mu$m) onto one side of a substrate film composed of a biaxially oriented OPP (20 $\mu$m) using a urethane-based adhesive (trade name: Unoflex J3; manufactured by Sanyo Chemical Industries, Ltd.) and dry-lamination of a surface-corona-treated LLDPE (trade name: KF101; manufactured by Kan Fil Co.; thickness: 40 $\mu$m) as an inner layer onto the other side of the biaxially oriented OPP gave a laminated film.

Comparative referential example 3

A vacuum thermal insulator can be obtained in the same way as disclosed in Referential Example 9 using two films obtained from the laminated film produced in Comparative Example 3. The thermal insulation property of the vacuum thermal insulator drastically deteriorates during aging.

EXAMPLE 10

An anchor coating agent (E) (a mixture of ADCOAT AD335 and CAT10 having a mixing ratio of 15/1 (weight ratio); manufactured by TOYO MORTON Co. Ltd.) was gravure-coated on a 20 $\mu$m thick biaxially oriented OPP (trade name: Pylene P2102; manufactured by TOYOBO CO. LTD.) by a microgravure-coat method using a test coater manufactured by Yasui Seiki (coating speed: 3 m/min; drying temperature: 80° C.). The thickness of the resultant anchor coating layer after dry was 0.15 $\mu$m. A biaxially oriented PET film having a gas barrier resin-containing layer (GB layer) thereon was produced by gravure-coating the coating liquid No. 1 on the anchor coating layer by a microgravure-coat method using a test coater manufactured by Yasui Seiki (coating speed: 6 m/min; drying temperature: 100° C.). The coating layer had the GB layer had a heat conductivity of 0.24 W/m•K and a thickness after dry of 0.5 $\mu$m.

On the GB layer in the biaxially oriented PET film obtained above, a surface-corona-treated linear polyethylene (LLDPE) (trade name: KF101; manufactured by Kan Fil Co.; thickness: 40 $\mu$m) was dry-laminated using a urethane-based adhesive (trade name: Unoflex J3; manufactured by Sanyo Chemical Industries, Ltd.) to produce a laminate film. An oxygen permeability of the GB layer in the laminated film was measured. The result is given in Table 3.

Referential Example 10

A bag 250 mm long and 250 mm wide was prepared by sealing LLDPE layers (inner layers) of two films obtained from the laminate film produced in Example 10 together at their three sides. The bag is filled with 100% open urethane foam having an average cell diameter of 75 $\mu$m (a core material; manufactured by KURABO INDUSTRIES LTD.) which has been heated at 120° C. for 1 hour and a getter (trade name: COMBOGETTER; manufactured by Saes getter Co., Ltd.), and the bag is sealed by welding at its unsealed side (sealed width: 10 mm) using a vacuum sealer (manufactured by NPC Co.) so that the inner pressure becomes 0.01 Torr to produce a vacuum thermal insulator. The value of H/d is 250. The thus obtained vacuum thermal insulator has extremely low heat conductivity and the thermal insulation property hardly deteriorates during aging.

Comparative Example 4

An anchor coating agent (E) (a mixture of ADCOAT AD335 and CAT10 having a mixing ratio of 15/1 (weight ratio); manufactured by TOYO MORTON Co. Ltd.) was gravure-coated on a 20 $\mu$m thick biaxially oriented OPP (trade name: Pylene P2102; manufactured by TOYOBO CO. LTD.) by a microgravure-coat method using a test coater manufactured by Yasui Seiki (coating speed: 3 m/min; drying temperature: 80° C.). The thickness of the resultant anchor coating layer after dry was 0.15 $\mu$m. A biaxially oriented OPP film having a resin-containing layer was produced by gravure-coating a polyvinylidene chloride emulsion (trade name: Kureharon DO888S; manufactured by Kureha Chemical Industry Co., Ltd. on the anchor coating layer by a microgravure-coat method using a test coater manufactured by Yasui Seiki (coating speed: 6 m/min; drying temperature: 100° C.). The resin-containing layer in the film had a heat conductivity of 0.24 W/m•K and a thickness after dry of 3 $\mu$m.

On the resin-containing layer in the resultant biaxially oriented OPP film, a surface-corona-treated linear polyethylene (LLDPE) (manufactured by Kan Fil Co.; thickness: 150 $\mu$m) was dry-laminated using a urethane-based adhesive (trade name: Unoflex J3; manufactured by Sanyo Chemical Industries, Ltd.) to produce a laminate film. An oxygen permeability of the resin-containing layer in the laminated film was measured. The result is given in Table 3.

Comparative referential example 4

A vacuum thermal insulator can be obtained in the same way as disclosed in Referential Example 10 using two films obtained from the film produced in Comparative Example 4. The value of H/d is 67. The thermal insulation property of the vacuum thermal insulator drastically deteriorates during aging.

TABLE 3

| | Oxygen permeability (cc/atm · m$^2$ · day) (at 23° C., 50% RH) | H/d | Thermal insulation property | W · $\lambda$ · P |
|---|---|---|---|---|
| Example 10 | 0.1 or less | 250 | Good | 9 × 10$^{-9}$ or less |
| Comparative Example 4 | 8.0 | 67 | Poor | 5.8 × 10$^{-6}$ |

Referential Example 11

Using two films obtained from the laminated film produced in the same way disclosed in Example 3, a vacuum thermal insulator can be produced in the same way as disclosed in Referential Example 3 except that the 100% open urethane foam having an average cell diameter of 75 $\mu$m (a core material; manufactured by KURABO INDUSTRIES LTD.) which has been heated at 120° C. for 1 hour is packed alone. The value of H/d becomes 250. The thus obtained vacuum thermal insulator has extremely low heat conductivity and the thermal insulation property hardly deteriorates during aging.

Comparative Example 5

Carrying out dry-lamination of a gas barrier layer of EVOH-F (manufactured by Kuraray Co., Ltd.; thickness: 15 $\mu$m) onto one side of a biaxially oriented PET (a substrate film) using a urethane-based adhesive (trade name: Unoflex J3; manufactured by Sanyo Chemical Industries, Ltd.) and dry-lamination of a surface-corona-treated LLDPE (manufactured by Kan Fil Co.; thickness; 150 $\mu$m) (inner layer) onto the other side of the biaxially oriented PET gave a laminated film.

Comparative referential example 5

A vacuum thermal insulator can be obtained in the same way as disclosed in Referential Example 11 using two films obtained from the laminated film produced in Comparative Example 5. The value of H/d is 67. The thermal insulation property of the vacuum insulator drastically deteriorates during aging.

What is claimed is:

1. A vacuum thermal insulator comprising a shell which defines a vacuum space inside and comprises at least one layer comprising a thermoplastic resin and an inorganic laminar compound as a material which can impart a gas barrier property to said thermoplastic resin and which is dispersed therein and satisfies the formula (1):

$$W \times \lambda \times P < 1 \times 10^{-6} \qquad (1)$$

wherein W is a thickness (m) of the gas barrier layer, $\lambda$ is a thermal conductivity (W/m•K) of the gas barrier layer and P is an oxygen permeability (cc/m$^2$•day•atm) of the gas barrier layer at 23° C. in a humidity of 50% RH.

2. The vacuum thermal insulator according to claim 1 further comprising a core material inside the shell.

3. The vacuum thermal insulator according to claim 1 further comprising a hollow structural body inside the shell.

4. The vacuum thermal insulator according to claim 3 further comprising a core material inside the hollow structural body.

5. The vacuum thermal insulator according to any one of claims 1, 2, and 3, wherein the gas barrier layer satisfies the formula (2):

$$1 \times 10^2 < V/(P \times S) < 5 \times 10^3 \quad (2)$$

wherein S is a area (cm$^2$) of the inner surface of the gas barrier layer, V is an actual volume (cm$^3$) of the vacuum space and P is an oxygen permeability (cc/m$^2$•day•atm) of the gas barrier layer at 23° C. in a humidity of 50% RH.

6. The vacuum thermal insulator according to any one of claims 1, 2 and 3, wherein the shell comprises at least one gas barrier layer and a sealant layer constituting the inner circumference layer of the shell.

7. The vacuum thermal insulator according to any one of claims 1, 2 and 3, wherein at least one gas barrier layer has an oxygen permeability of 0.5 cc/m$^2$•day•atm or less at 23° C. in a humidity of 50% RH.

8. The vacuum thermal insulator according to any one of claims 1, 2 and 3, further comprising a getter inside the shell.

9. The vacuum thermal insulator according to any one of claims 1, 2 and 3, which has, inside the shell, a getter previously dehydrated.

10. The vacuum thermal insulator according to any one of claims 1, 2 and 3, which has, inside the shell, a getter comprising iron powder.

11. The vacuum thermal insulator according to any one claims 1, 2 and 3, which has, inside the shell, a getter formed of a composition comprising iron powder and resin.

12. The vacuum thermal insulator according to any one of claims 1, 2 and 3, which has, inside the shell, a synthetic zeolite having pores.

13. The vacuum thermal insulator according to any one of claims 1, 2 and 3, which has, inside the shell, a synthetic zeolite having pores, wherein an average diameter of the pores ranges from 8 A to 12 A.

14. The vacuum thermal insulator according to any one of claims 1, 2 and 3, which has an alloy getter inside the shell.

15. The vacuum thermal insulator according to any one of claims 1, 2 and 3, wherein the shell is constructed from at least one multi-layered film comprising at least one gas barrier layer and at least one sealant layer constituting at least one surface of the multi-layered film with at least a part of the sealant layer being sealed with another part of the sealant layer or with at least a part of another sealant layer wherein the part of the sealant layer sealed satisfies the formula (3):

$$H/d > 20 \quad (3)$$

wherein H and d, respectively, indicate a width (mm) and a thickness (mm) of the sealant layer in the sealed part.

16. A refrigerator or a freezing chamber comprising the vacuum thermal insulator according to claim 1.

17. A construction material comprising the vacuum thermal insulator according to claim 1.

18. A vacuum thermal insulator comprising a shell which defines a vacuum space inside and comprises at least one gas barrier layer comprising a thermoplastic resin and an organic laminar compound as a material which can impart a gas barrier property to said thermoplastic resin and which is dispersed therein and satisfies the formula (1):

$$W \times \lambda \times P < 2 \times 10^{-7} \quad (1)$$

wherein W is a thickness (m) of the gas barrier layer, λ is a thermal conductivity (W/m•K) of the gas barrier layer and P is an oxygen permeability (cc/m$^2$•day•atm) of the gas barrier layer at 23° C. in a humidity of 50% RH.

19. A vacuum thermal insulator comprising a shell which defines a vacuum space inside and comprises at least one gas barrier layer comprising a thermoplastic resin and an inorganic laminar compound which is dispersed in said thermoplastic resin, and satisfying the formula (1):

$$W \times \lambda \times P < 1 \times 10^{-6} \quad (1)$$

wherein W is a thickness (m) of the gas barrier layer, λ is a thermal conductivity (W/m•K) of the gas barrier layer and P is an oxygen permeability (cc/m$^2$•day•atm) of the gas barrier layer at 23° C. in a humidity of 50% RH; and wherein said inorganic laminar compound has an aspect ration in a range of not less than 50 and not more than 5,000.

20. A laminar thermal insulator comprising a shell which defines a vacuum space inside and comprises at least one gas barrier layer comprising a thermoplastic resin and an inorganic laminar compound which is dispersed in said thermoplastic resin, and satisfying the formula (1):

$$W \times \lambda \times P < 1 \times 10^{-6} \quad (1)$$

wherein W is a thickness (m) of the gas barrier layer, λ is a thermal conductivity (W/m•K) of the gas barrier layer and P is an oxygen permeability (cc/m$^2$•day•atm) of the gas barrier layer at 23° C. in a humidity of 50% RH; and wherein said inorganic laminar compound has an aspect ration of not less than 200 and not more than 3,000.

* * * * *